United States Patent
Sujan et al.

(10) Patent No.: US 10,351,138 B2
(45) Date of Patent: Jul. 16, 2019

(54) ACTIVE PROGNOSTICS AND DIAGNOSTICS OF ENGINE-DRIVEN ROTARY ACCESSORIES WITH INTERMITTENT DUTY CYCLES

(71) Applicant: Cummins Inc., Columbus, IN (US)

(72) Inventors: Vivek A. Sujan, Columbus, IN (US); Anthony J. Cook, Geneva, IL (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 15/816,271

(22) Filed: Nov. 17, 2017

(65) Prior Publication Data

US 2019/0152485 A1    May 23, 2019

(51) Int. Cl.
| | | |
|---|---|---|
| *B60W 30/18* | (2012.01) | |
| *B60W 10/02* | (2006.01) | |
| *B60W 50/00* | (2006.01) | |
| *B60W 10/06* | (2006.01) | |
| *B60W 10/30* | (2006.01) | |

(52) U.S. Cl.
CPC ...... *B60W 30/18181* (2013.01); *B60W 10/02* (2013.01); *B60W 10/06* (2013.01); *B60W 10/30* (2013.01); *B60W 50/0097* (2013.01); *B60W 2510/06* (2013.01); *B60W 2710/0644* (2013.01); *B60W 2710/0677* (2013.01)

(58) Field of Classification Search
CPC .......... B60W 30/18181; B60W 10/02; B60W 10/06; B60W 10/30; B60W 50/0097; B60W 2510/06; B60W 2710/0644; B60W 2710/0677
USPC ................................................. 701/101, 29.2
See application file for complete search history.

(56) References Cited

U.S. PATENT DOCUMENTS

| | | |
|---|---|---|
| 5,931,008 A | 6/1999 | Mizutani et al. |
| 6,249,726 B1* | 6/2001 | Burke, II ............. B60H 1/3225 192/150 |
| 6,381,545 B1 | 4/2002 | Goubeaux et al. |
| 7,878,006 B2 | 2/2011 | Pham |
| 8,039,976 B2* | 10/2011 | Sato ........................ B60K 6/48 290/400 |
| 8,205,461 B2 | 6/2012 | Johnston et al. |
| 8,830,079 B2 | 9/2014 | Smith et al. |
| 9,403,416 B2 | 8/2016 | Hongi |

* cited by examiner

*Primary Examiner* — Mahomoud Gimie
(74) *Attorney, Agent, or Firm* — Taft Stettinius & Hollister LLP (57) ABSTRACT

One embodiment is a system comprising an engine structured to output torque to an accessory drive, a rotary load structured to be selectably driven by the accessory drive, and an electronic control system. The electronic control system is operable to selectably engage and disengage the rotary load effective to vary the load on the engine, monitor engine load values in coordination with engagement of the rotary load, store a data set comprising the monitored engine load values in association with values of one or more associated system conditions in a non-transitory memory medium, update a mathematical model of the system stored in the non-transitory memory medium in response to the engine load values to converge one or more model parameters, diagnose or prognosticate a failure state of the rotary load in response to a change in the one or more model parameters, and output a perceptible diagnostic indication of the failure state in response to the diagnosis or prognostication.

26 Claims, 4 Drawing Sheets

ACTIVE PROGNOSTICS AND DIAGNOSTICS OF ENGINE-DRIVEN ROTARY ACCESSORIES WITH INTERMITTENT DUTY CYCLES

BACKGROUND

The present application relates to diagnostics and prognostics of rotary engine accessories with intermittent duty cycles such as air-conditioner compressors, air compressors, radiator fans, and selectably engageable alternators and pumps, among other such devices. Rotary engine accessories with intermittent duty cycles may experience a variety of failure modes resulting in inconvenience and elevated cost. A variety of diagnostic approaches have been proposed. Yet, conventional proposals suffer from a number of drawbacks, shortcomings and inadequacies relating to diagnostics and prognostics of failures of rotary engine-driven accessories with intermittent duty-cycles. For example, conventional approaches fail to account for the real world operational demand and duty cycles of rotary engine accessories with intermittent duty cycles which significantly constrain and frustrate reliable diagnostics and prognostics. As one example, for commercial on-highway vehicles there is often significant use of the air-conditioner compressor due to the length of the missions and ambient temperatures encountered. In such applications and environments, air-conditioner compressors may experience a relatively high failure rate, creating operator inconvenience and cost issues. Similar issues may be present for a number of other rotary engine accessories with intermittent duty cycles including those noted above. Heretofore, conventional efforts have fallen short of providing a reliable and robust solution to predict or warn the operator ahead of time that rotary engine accessories with intermittent duty cycles are approaching failure or are likely to fail. Reliably predicting component failure in advance of a failure event is desirable to minimize cost effects since failure of one component can lead to damage or failure of associated components damage as well as allowing the operator to get service in a timely manner thereby minimizing operator inconvenience. There remains a substantial need for the unique apparatuses, methods, systems and techniques disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment comprises a unique diagnostic and prognostic system for rotary accessory loads. Another embodiment is a unique process for diagnosis and prognosis of rotary accessory loads. Further embodiments, forms, objects, features, advantages, aspects, and benefits shall become apparent from the following description and drawings.

DETAILED DESCRIPTION OF ILLUSTRATIVE EMBODIMENTS

Figure 1:
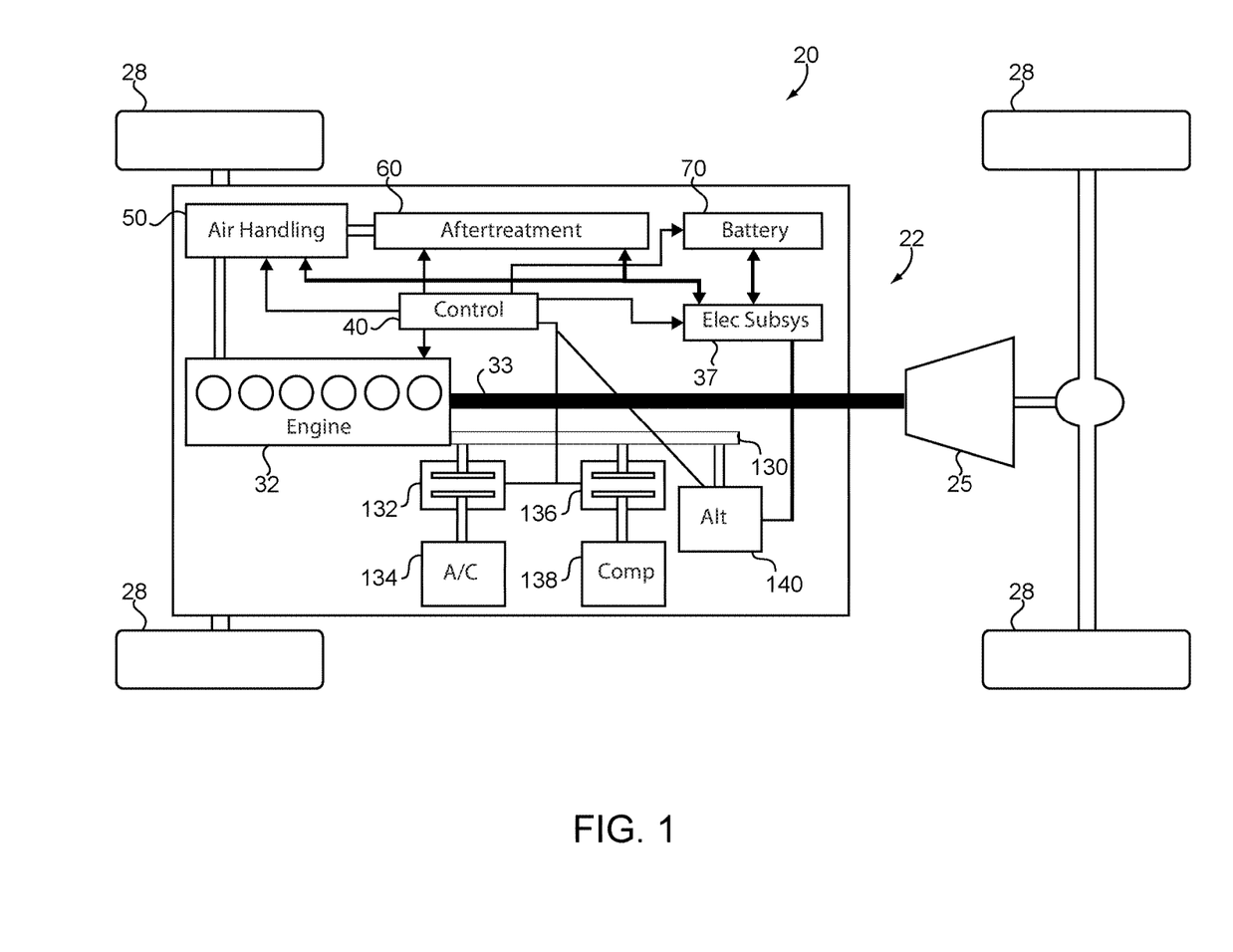
FIG. 1 is a partially diagrammatic view illustrating certain aspects of a system including an exemplary powertrain.

With reference to FIG. 1, there is illustrated a partially diagrammatic view of certain aspects of an exemplary prime mover system 20 including an exemplary powertrain 22. In the illustrated embodiment, system 20 is provided as a vehicle system and powertrain 22 is provided in a form including a primary torque output path from internal combustion engine 32 to driveshaft 33, transmission 25 and ground engaging wheels 28 in sequence, and a secondary or parasitic torque output path from internal combustion engine 32 to accessory drive subsystem 130. In further embodiments, powertrain 22 may be provided as a hybrid powertrain, for example, as a pre-transmission series-parallel hybrid powertrain, a parallel hybrid powertrain, a series hybrid powertrain, or a series-parallel hybrid powertrain. While in the illustrated embodiment the propulsion of system 20 is provided by the rear wheels 28, it shall be appreciated that other embodiments are provided in front-wheel drive and four-wheel drive and all-wheel drive forms. In certain forms, system 20 may be an on-highway tractor trailer, on-road bus, delivery truck, service truck or the like. In other forms system 20 may be of a different type, including other types of on-road or off-road vehicles. It shall be further appreciated that the configuration and components of system 20 and of powertrain 22 are but one example, and that this disclosure contemplates that a variety of different powertrain applications, configurations and components may be utilized, for example, other prime mover applications such as marine vessels, generator sets and hydraulic pumping systems to name several further examples.

In the illustrated embodiment, engine 32 is of a four-stroke, six cylinder, diesel-fueled, Compression Ignition (CI) type with multiple cylinders and corresponding reciprocating pistons coupled to crankshaft 33, which typically would be coupled to a flywheel. Crankshaft 33 is mechanically coupled to controllable clutch 34. Engine 32 may be of a conventional type with operation modifications to complement operation in system 20. In other embodiments, engine 32 may be of a different type, including different fueling, different operating cycle(s), different ignition and different numbers and configurations of cylinders among other variations.

System 20 further includes an electronic control system 40 which may be configured to control various operational, diagnostic and prognostic aspects of system 20 and powertrain 22 as described in further detail herein. Electronic control system 40 may be implemented in a number of forms. In certain preferred forms electronic control system 40 may incorporate one or more microprocessor-based or microcontroller-based electronic control units (ECU) sometimes referred to as electronic control modules (ECM). Electronic control system 40 may be provided as a single processing or computing component, or a collection of operatively coupled processing or computing components; and may comprise digital circuitry, analog circuitry, or a hybrid combination of both of these types. The circuitry of electronic control system 40 and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein.

When of a multi-component form, electronic control system 40 may have one or more components remotely located relative to the others in a distributed arrangement. Such remote location may be remote in the sense that the components are distribute remotely from one another within system 20 or that one or more components are distributed remotely from system 20 itself. Electronic control system 40 can include multiple processing units arranged to operate independently, in a pipeline processing arrangement, in a parallel processing arrangement, or combinations thereof. In certain embodiments, electronic control system 40 includes several programmable microprocessor or microcontroller units of a solid-state, integrated circuit type that are disturbed throughout system 20 that each include one or more processing units and non-transitory memory devices. It shall be appreciated that reference here to such controller, processor and memory devices extends to and encompasses multiple ones of a given class or type of device as well as combinations of different device types unless stated otherwise. For the depicted embodiment, electronic control system 40 includes a computer network interface to facilitate communications using a controller area network (CAN) communications, local area network (LAN) communications, wide area network (WAN) communications, cellular or LTE network communications or other types of network communications. It shall be further appreciated that the depicted blocks, or other organizational units of electronic control system 40 refer to certain operating logic performing indicated operations that may each be implemented in a physically separate controller of electronic control system 40 and/or may be virtually implemented in the same controller.

Electronic control system 40 may be configured or structured to execute instructions and logic stored in one or more non-transitory memory media to provide the controls, diagnostics, prognostics and management and regulation functions disclosed herein. Such instructions and operating logic may be in the form of one or more microcontroller or microprocessor routines stored in a non-transitory memory, dedicated hardware, such as a hardwired state machine, analog calculating machine, various types of programming instructions, and/or a different form as would occur to those skilled in the art. Such instructions and operating logic may be structured and organizes in a variety of logical blocks, objects and other organizational units. Examples of the structural units of the electronic control system 40 may include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hardwired logic circuits, reconfigurable logic circuits in a particular non-transient state configured, any actuator including at least an electrical, hydraulic, or pneumatic actuator, a solenoid, an op-amp, analog control elements (springs, filters, integrators, adders, dividers, gain elements), and/or digital control elements.

System 20 includes accessory drive subsystem 130 which is operatively coupled with and receives torque from engine 32. A number of rotary loads may be selectably engaged with accessory drive subsystem 130 including, for example, air compressors, alternators, motor/generators, and hydraulic pumps to name several examples. In the illustrated embodiment, an air-conditioning compressor 134 is selectably engageable with accessory drive subsystem via an electronically controllable clutch 132. An air compressor 138 is also selectably engageable with accessory drive subsystem via an electronically controllable clutch 136. An alternator 140 is selectably engageable with accessory drive subsystem 130 by electrically connecting and disconnecting the output load circuit. It shall be appreciated that these rotary accessory devices are exemplary rotary loads rather than being limiting or required, and that a variety of other rotary loads and combinations of rotary loads may be provided and driven by accessory drive subsystem 130. System 20 further includes air handling subsystem 50, aftertreatment subsystem 60, electrical subsystem 37, and battery subsystem 70 which are in operative communication with electronic control system 40. A variety of other electrical and mechanical subsystem and combinations of subsystems may also be provided in certain embodiments. A plurality of electrical loads may be operatively coupled with battery subsystem 70 via electrical subsystem 37 including, for example, loads provided in or associated with air handling subsystem 50, aftertreatment equipment 60, and various electrically driven accessories. The foregoing and other devices, subsystems and loads may be controlled and managed by electronic control system in accordance with a variety of control strategies and logic as would occur to one of skill in the art with the benefit of the present disclosure. Furthermore, the foregoing and other devices, subsystems and loads may also be controlled and managed by electronic control system for the purposes of performing the diagnostic and prognostic operations disclosed herein. Such control and management may be performed to enhance the richness or diversity of a data set pertaining to the diagnostics and prognostics disclosed herein.

Data set richness or diversity may be evaluated, improved, monitored and tracked using a number of data set richness metrics. Data set richness metrics afford the ability to characterize and evaluate the richness or diversity of values of a data set stored in a non-transitory memory device or medium. Data set richness metrics may account for data dispersion, sometimes referred to as variability, scatter or spread, which offer quantifiable values of the extent to which a set of data is stretched or squeezed relative to a reference point or points or relative to one another. One example of a data set richness metric accounting for dispersion is a nonnegative real number that is zero if all the data are the same and increases as the data become more diverse. Additional examples of dispersion metrics include standard deviation, variance, variance-to-mean ratio, interquartile range (IQR), range, mean absolute difference (also known as Gini mean absolute difference), median absolute deviation (MAD), average absolute deviation (or simply called average deviation) and distance standard deviation. Further examples of dispersion metrics include coefficient of variation, quartile coefficient of dispersion, relative mean difference and entropy. It shall be appreciated that techniques such as heuristics and experientially-derived limits or ranges may be utilized to refine and target certain thresholds, ranges and scales for purposes of evaluating data set richness or diversity. It shall be further appreciated that techniques such as entropy and information theoretic measures on data richness may also be utilized in evaluating data set richness or diversity.

Figure 2:
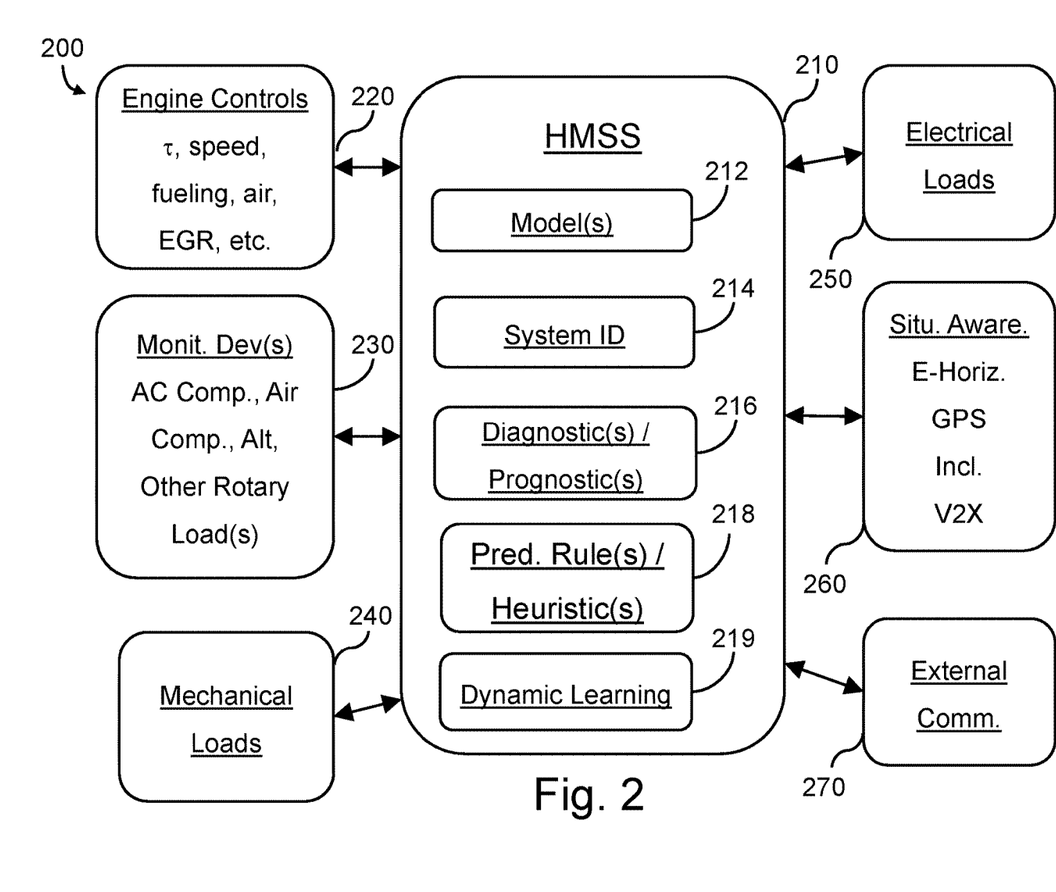
FIG. 2 is a schematic view illustrating certain aspects of an exemplary health monitoring subsystem which may be provided in the system of FIG. 1.

Referring now to FIG. 2, there is illustrated a block diagram of exemplary controls 200 which may be implemented in one or more components of an electronic control system such as electronic control system 40 or various other electronic control systems utilized in connection with prime mover systems including engine-driven rotary loads with intermittent duty cycles. Controls 200 include a health monitoring block 210 which is in operative communication with and may be structured to receive inputs from and send outputs to engine controls block 220, monitored devices block 230, mechanical loads block 240, electrical loads block 250, situational awareness block 260 and cloud communication block 270. It shall be further appreciated that health monitoring subsystem 210 may be provided or may access additional inputs provided or available to electronic control system 40 including, inputs indicating the operational state of any of the components illustrated in FIG. 1, climate control settings, operator driving inputs such as accelerator, braking and cruise control settings and inputs indicating ambient conditions such as temperature, humidity and precipitation to name a several examples.

Health monitoring subsystem block 210 includes one or more models 212 which may be provided as a variety of types of mathematical models stored in one or more non-transitory computer readable media of electronic control system 40. Models 212 generally comprise mathematical models accounting for the attributes, behavior, operation and of one or more devices or subsystems of a prime mover system such as prime mover system 20. Models 212 may comprise a variety of different mathematical models of varying complexity. Such models may include one or more physics-based model components, one or more empirically based model components, one or more correction components and other types of mathematical components and combinations thereof. It shall be appreciated that model components and terms may be described herein in terms of formulae which may be implemented in a variety of manners including explicit calculations, computations or estimations, lookup tables, matrices and matrix operations among other techniques as would occur to one of skill in the art with the benefit of the present disclosure.

For purposes of illustration, some examples of physics-based model components include model terms based on one or more physical laws (e.g., $F=ma$, where F is force, m is mass and a is acceleration, or $\tau=I\alpha+d\omega$ where $\tau$ is torque, I is inertia, $\alpha$ is angular acceleration, d is a damping coefficient and $\omega$ is angular velocity). Examples of empirically determined model components include empirically determined correction factors which may be predetermined using analytics and statistics of empirical system operational data (e.g., $F=ma+b*v$, where F is force or engine torque, m is vehicle mass, and a is vehicle acceleration, b is an empirically determined weighting factor and v is vehicle velocity, or $\tau=I\alpha+d\omega+z$, where $\tau$ is rotary torque, I is inertia, $\alpha$ is angular acceleration, d is a damping coefficient and $\omega$ is angular velocity and z is one or more unmodeled dynamic terms which may be empirically determined). Examples of real-world correction components include terms which may be arbitrarily selected or selected using heuristics.

Health monitoring subsystem block 210 includes system identification block 214 which is structured to perform system identification processes. Certain system identification processes are structured to perform convergence operations for model terms which may be unknown, undetermined or significantly inaccurate a priori to convergence of model using updates of operational data. Some examples of such terms include, e.g., the values of vehicle mass m and weighting factor b in the examples given above. Convergence operations may include updating values of one or more model parameters using received measured data for engine torque value F and responses of system to perturbation or excitement. A number of techniques may be used to perform or in conjunction with performance of convergence operations. Examples, of certain exemplary techniques include state observers such as Luenberger's state observer for deterministic linear system, Kalman filters or observers which may be linear or non-linear, the later including extended Kalman filter techniques. Principally-linear convergence processes such as recursive least squares techniques may be utilized. Optimized parameter searches, such as, Golden search, Parabolic interpolation, Downhill Simplex methods, Steepest decent, Simulated Annealing, Dynamic programming, and Genetic Algorithms may also be used. Irrespective of the particular technique used, the richness or diversity of the data set upon which the model and convergence operations draw plays a substantial role in robustness and accuracy of model based diagnostics and prognostics.

Certain other system identification processes include data set richness processes such as data set richness determination or evaluation processes and data set richness control or enhancement processes. Diagnostics and prognostics utilizing convergence techniques such as the foregoing is influenced by a number of factors including the diversity or richness of the data set values relevant to convergence operations. There are disclosed herein unique techniques for strategically exciting the system to create and obtain rich or diverse data sets. In the case of rotary engine accessories with intermittent duty cycles obtaining rich, diverse data sets poses unique challenges. Typically, both accessories and the prime mover system which drives them should be controlled to meet operator demands at any given operational state. These demands dictate the characteristics of the data set produced by on-line monitoring and model convergence and constrain the system operating conditions from which the data set may be drawn. System ID block 214 may be configured to strategically control the engine, transmission, rotary engine accessories, electrical loads and other mechanical loads such that the operator demands are met (or are within a predetermined variance or error) while the operational state of the system is varied. For example, system ID block may request variation in the operation of engine controls 220 which may be structured to control engine torque, engine speed, fueling, air handling, EGR and other engine control parameters. System ID block may request variation in the operation of one or more monitored devices 230 (e.g., an air-conditioner compressor, air compressor, alternator or other rotary engine loads), variation in the operation of other mechanical loads 240 and/or variation in the operation of electrical loads 250. To take one further illustrative example, if a vehicle traveling over relatively flat desert terrain on a hot day with cruise control set, system ID block 214 may be structured to identify opportunities for varying accessory loads, engine output and transmission gear selection while maintaining the speed set point within a predetermined variance which will be minimally perceptible to an operator (e.g., +/−2 mph) and maintaining vehicle cab set point also within a predetermined variance which will be minimally perceptible to an operator (e.g., +/−1° C., or −2 degrees C.<variance<+1° C.).

System ID block 214 may control one or both of the timing of engagement of the rotary load and the operation of or more components or subsystems of the system (e.g., the engine, transmission, electrical loads, mechanical loads and combinations thereof) in order to improve a data set richness metric. To take one illustrative example, system ID block may super-cool the vehicle cab below the operator set point, and utilize the super cooling event as an opportunity to disengage and reengage the air-conditioner compressor with a greater degree of freedom than would be otherwise permitted by the upper temperature range constraint in order to capture engagement events over an expanded richness or diversity of system operating conditions. Additionally, or alternatively, system ID block 214 may control operation of or more components or subsystems of the system in a manner that varies from the operator specified operating set points and in coordination with engagement of the rotary load to improve the data set richness metric. In certain forms the data set richness metric may comprise one or both of engine speed and engine load and the system ID block may control the timing of engagement of the rotary load to improve the data set richness metric by increasing diversity of one or both of engine speed values and engine load values of the data set.

In one exemplary form, system ID block 214 is configured for operation with a mathematical model of air-conditioner compressor health which is of the form: $Y_{HVAC}=f(\tau)+\sigma_Y$. $Y_{HVAC}$ is the HVAC health factor which, in the present example, varies from 0 to 1 based on HVAC engine load parameter $\tau$. When $Y_{HVAC}=1$, the air-conditioner compressor health is nominal. When $Y_{HVAC}=0$, the air-conditioner compressor health has reached complete failure. The value of $\sigma_Y$, indicates the degree of uncertainty in the estimate of $Y_{HVAC}$. It is also assumed that the HVAC engine load nominally is $\tau_{HVAC-ON}$ and $\tau_{HVAC-OFF}$ when ON/OFF respectively. In the present exemplary form, system learning through excitation is performed. A nominal and current value for $\tau_{HVAC-ON}$ and $\tau_{HVAC-OFF}$ is determines by activating and deactivating the HVAC system under conditions and timing that balance the operational goal of operator comfort through minimum actual temperature deviation from target set point and the operational goal of minimizing uncertainty of the measurements from the engine (e.g., engine torque with HVAC OFF → $\tau_{ENG}+\tau_{HVAC-OFF}=\tau_{ENG\ W/HVAC\ OFF}+\sigma_{OFF}$, and Engine torque with HVAC ON → $\tau_{ENG}+\tau_{HVAC-ON}=\tau_{ENG\ W/HVAC\ ON}+\sigma_{ON}$). It shall be appreciated that multiple unknown parameters may be solved through multiple readings. Uncertainty may be reduced through repeated readings as well as reduction of uncertainty through independent readings. This system learning through excitation may be performed throughout the life of the HVAC system as long as the system is active by the operator (including nominal readings to assess initial healthy conditions). During mission conditions when the vehicle operator has activated the HVAC system, the controls of system ID block 214 may automatically turn the compressor on/off based on the above conditions (operator comfort, upcoming environment conditions, minimize measurement uncertainty). Using an information theory metric, upcoming terrain data can be combined with the expected engine loadings through this look-ahead period, to determine when the HVAC should be triggered on/off such that the measured changes in the engine load can produce "low uncertainty" readings on torque. Additionally, by making use of environment heat transfer models, a determination of the cab temperature can be made. Control actions can then be taken if the in-cab temperature conditions do not change (increase or decrease) significantly past the set point temperature and the resulting torque readings will be useful in determining the HVAC $\tau_{HVAC-ON}$ and $\tau_{HVAC-OFF}$ with low uncertainty. It shall be further appreciated that a similar process can be performed for other model formulations for the HVAC system.

Health monitoring subsystem block 210 includes diagnostic(s)/prognostic(s) block 216 and prediction rule(s)/heuristic(s) block 218 and dynamic learning block 219. Diagnostic(s)/prognostic(s) block 216 is configured to evaluate or predict the health or failure of one or more monitored devices 230 (e.g., an air-conditioner compressor, air compressor, alternator or other rotary engine loads) based upon observations or changes in the one or more parameters of model 212, for example, using the exemplary health factor model $Y_{HVAC}$ discussed above. Prediction rule(s)/heuristic(s) block 218 is configured to provide one or more rules and/or heuristics which may be utilized by block 216 in evaluating or predicting the health or failure of one or more monitored devices 230. Exemplary rules may comprise one threshold, one or more thresholds, hysteresis, and dynamic thresholds among other techniques. Dynamic learning block 219 is configured to dynamically adapt or vary the prediction rule(s) and/or heuristic(s) of block 218. Block 216 may apply a threshold to a value of a quantity or its time derivative to evaluate not only that the load has changed, but the rate at which it is changing. This may be implemented in a variety of logic such as the matrix of options. 218 and the rules themselves may be dynamic, e.g., rules 1-4 apply, but then when a trigger event occurs, rules 2-6 apply.

Situational awareness block 260 is configured to provide information pertaining to the operational environment, e.g., electronic-horizon information, GPS information, information from an inclinometer and/information from a vehicle-to-X (V2X) system. Such information may be utilized by health monitoring subsystem block 210 to identify and execute on opportunities for improving a data set richness metric. External communication block 270 provides an interface to one or more external networks or data centers which may provide increased computational power. It shall be appreciated that any operations and computationally intensive operations in particular may be performed externally with the necessary inputs and resulting outputs being communicated via external communication interface 270.

Figure 3A:
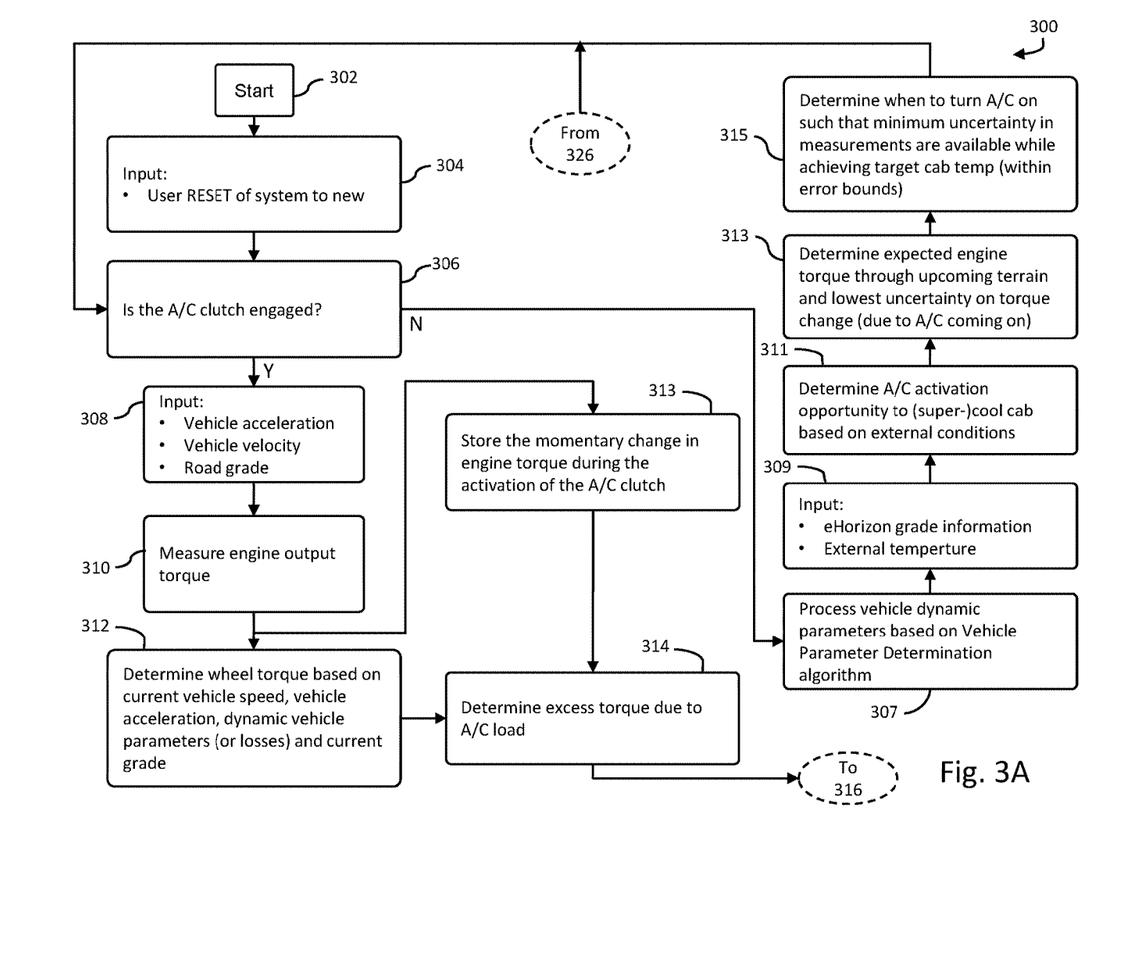
FIGS. 3A and 3B are a flowchart illustrating certain aspects of an exemplary health monitoring processes which may be implemented in the system of FIG. 1 and the subsystem of FIG. 2.
Figure 3B:
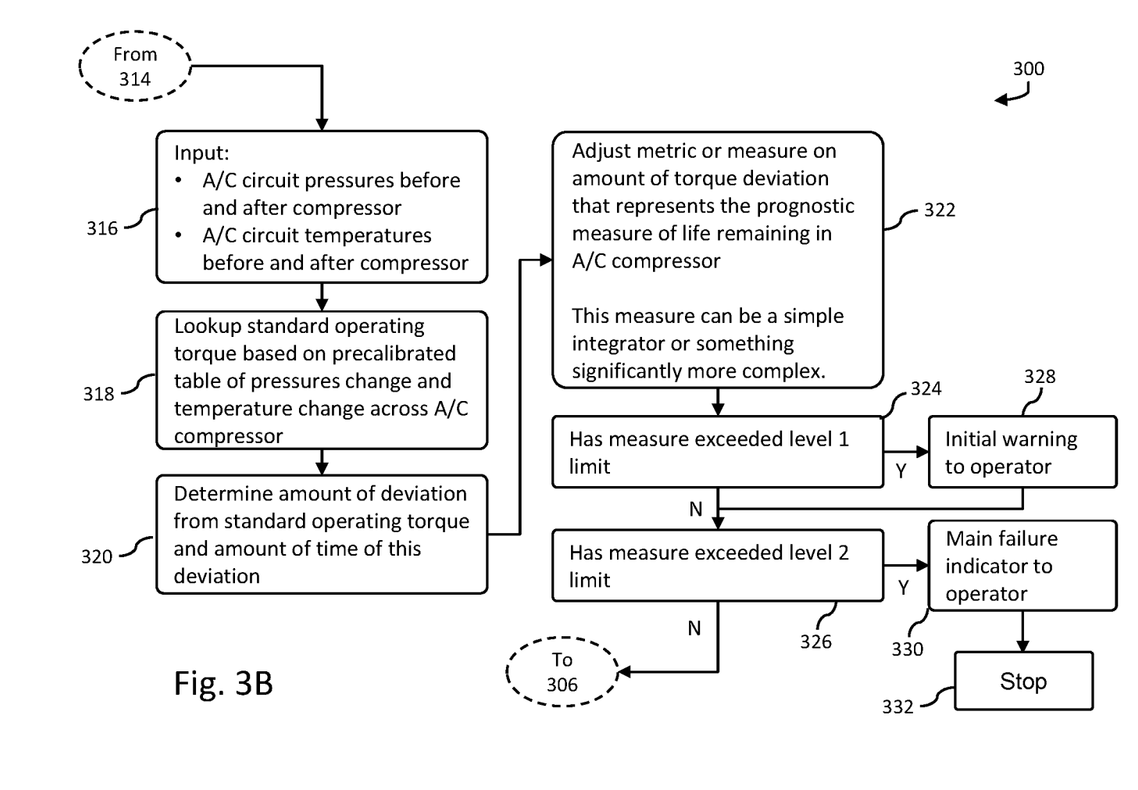

With reference to FIGS. 3A and 3B there is illustrated a flowchart depicting certain aspects of an exemplary health monitoring process 300. For purposes of illustration, process 300 is described in the context of diagnostics and prognostics pertaining to the health of a vehicle cab air-conditioner compressor. It shall be appreciated that the principles and operations of process 300 apply and extend to diagnostics and prognostics for health monitoring of a variety of other rotary loads including those disclosed herein. It shall be further appreciated that, process 300 is one example of a process configured to serve potentially competing and sometimes divergent control goals, for example, maintaining a desired cab temperature and enhancing a richness metric of data associated with the diagnostic(s) and prognostic(s) of the air-conditioner compressor.

Process 300 is initiated at start operation 302 and proceeds to operation 304 which receives input from a user or control system component indicating a reset of the system to a new state. Such a reset may occur, for example, when the system in which process 300 is implemented is first commissioned or when a rotary accessory which is being evaluated by process 300 is replaced. From operation 304 process 300 proceeds to conditional which evaluates whether an electronically controllable clutch through which an air-conditioner compressor is coupled to a mechanical accessory drive is being engaged or if an engagement has been commanded or is imminent. If conditional 306 evaluates that the clutch is not engaged, process 300 proceeds to operation 307 which processes vehicle dynamic parameters based on Vehicle Parameter Determination (VPD) techniques and processes. In general, VPD techniques and processes are configured to update the value of one or more model parameters to converge the model parameters. Non-limiting examples of such techniques and processes are further described in U.S. application Ser. No. 14/976,717 entitled "Vehicle Controls Including Dynamic Vehicle Parameter Determination" and filed on Dec. 21, 2015 the disclosure of which is incorporated herein by reference.

From operation 307, process 300 proceeds to operation 309 which receives input pertaining to environmental conditions such as external temperature and electronic horizon grade information. From operation 309, process 300 proceeds to operation 311 which evaluates whether there exists an air-conditioning activation opportunity to cool or super-cool a vehicle cab based on external conditions. From operation 311, process 300 proceeds to operation 313 which determines an expected engine torque through upcoming terrain and a lowest uncertainty on torque change due to the air-conditioner compressor coming online. It shall be appreciated that lowest uncertainty conditions are helpful to detect small changes in torque which may occur for the air conditioner load. In a noisy part of the engine map, small changes in load would not otherwise be observed since the noise would wash them out. Accordingly, operating map locations with high signal/noise ratios may be identified and targeted for sampling or measurement. From operation 313, process 300 proceeds to operation 315 which determines whether to turn the air-conditioner on such that the minimum uncertainty in measurements are available while achieving target cab temperature within established bounds or constraints on variance or error relative to an operator set point (e.g., +/−1° C., or −2° C.<variance<+1° C.). From operation 315, process 300 proceeds to conditional 306 which performs the aforementioned evaluation of whether the air-conditioner clutch is engaged.

If conditional 306 evaluates that the clutch is engaged, process 300 proceeds to operation 308 which receives one or more inputs pertaining to the operational state of the system. In the illustrated embodiment the inputs received at operation 308 comprise vehicle acceleration, vehicle velocity, road grade, engine speed and engine torque, and may further comprise ambient conditions such as temperature, pressure and humidity as well as other loads on the engine from other accessories that are variable in nature such as alternators, fans, water pumps, air compressors and others. The received inputs are stored in a non-transitory memory medium or device. From operation 308, process 300 proceeds to operation 310 which measures engine output torque. As noted below one or more measured engine output torque values are stored in a non-transitory memory medium or device in association with the received inputs of operation 308.

From operation 310, process 300 proceeds in parallel to operations 312 and 313. Operation 312 determines wheel torque based on vehicle speed, vehicle acceleration, dynamic vehicle parameters or losses and current road grade. Operation 312 provides information of proportion of the engine load which is used for propulsion versus other non-propulsion work such as accessory loads. Part of the non-propulsion work may be the air conditioner compressor. Accordingly, information about operation of the air conditioner compressor can be measured during air conditioner operation while the overall engine load changes, and is not limited to measurement only during switching on/off events. Operation 313 stores a value indicative of the momentary change in engine torque during the engagement of the air-conditioner compressor in association with the received inputs of operation 308. From operations 312 and 313, process 300 proceeds to operation 314 which determines a value indicative of excess torque due to the air-conditioner load being engaged.

From operation 314, process 300 proceeds to operation 316 which receives input values indicative of the air-conditioner circuit pressures upstream and downstream of the air-conditioner compressor and the air-conditioner circuit temperatures upstream and downstream of the air-conditioner compressor. From operation 316, process 300 proceeds to operation 318 which determines a standard operating torque (e.g., by a lookup operation) based on a pre-calibrated table of pressure changes and temperature changes across the air-conditioner compressor. From operation 318, process 300 proceeds to operation 320 which determines an amount of deviation from a standard operating torque and an amount of time of the deviation. From operation 320, process 300 proceeds to operation 322 which adjusts a metric or measure of the amount of torque deviation that represents the prognostic measure of the life remaining of the air-conditioner compressor. It shall be appreciated that the metric of remaining life may be an accumulator or integrator or a more complex health status indicator.

Form operation 322, process 300 proceeds to conditional 324 which evaluates whether the health metric has exceeded a first limit. If conditional 324 evaluates that the health metric has exceeded the first limit, process 300 proceeds to operation 328 which provides an initial warning to an operator and then proceeds to conditional 326.

If conditional 324 evaluates that the health metric has not exceeded the first limit, process 300 proceeds to conditional 326 which evaluates whether the health metric has exceeded a second limit. If conditional 326 evaluates that the health metric has exceeded the second limit, process 300 proceeds to operation 330 which provides a main failure indication to the operator and then proceeds to stop operation 322. If conditional 326 evaluates that the health metric has not exceeded the second limit, process 300 proceeds to operation 306 and then proceeds from that point as described above.

It shall be appreciated that process 300 is one non-limiting example of a process which may be performed by an electronic control system to selectably engage and disengage the rotary load effective to vary the load on the engine, receive engine load values associated with engagement of the rotary load, store a data set comprising the received engine load values in association with one or more associated system conditions in a non-transitory memory medium, update a mathematical model of the system stored in the non-transitory memory medium in response to the received engine load values to converge one or more model parameters, diagnose or prognosticate a failure of the rotary load in response to a change in the one or more model parameters, output a diagnostic indication of the failure in response to the diagnosis or prognostication, and at least one of control timing of engagement of the rotary load to improve a data set richness metric in response to current or predicted system operating conditions and control operation of or more subsystems of the system during engagement of the rotary load to improve the data set richness metric. Further examples include additional and alternate features as would occur to one of skill in the art with the benefit of the present disclosure.

A number of further exemplary embodiments shall now be described. A first embodiment is a system comprising: an engine structured to output torque to an accessory drive; a rotary load structured to be selectably driven by the accessory drive; and an electronic control system configured to selectably engage and disengage the rotary load effective to vary the load on the engine, monitor engine load values in coordination with at least one of engagement and disengagement of the rotary load, store a data set comprising the monitored engine load values in association with values of one or more associated system conditions in a non-transitory memory medium, update a mathematical model of the system stored in the non-transitory memory medium in response to the engine load values to converge one or more model parameters, diagnose or prognosticate a failure state of the rotary load in response to a change in the one or more model parameters, and output a perceptible diagnostic indication of the failure state in response to the diagnosis or prognostication; wherein the electronic control system at least one of (a) controls timing of engagement of the rotary load to improve a data set richness metric in response to current or predicted system operating conditions, and (b) controls operation of one or more subsystems of the system in coordination with engagement of the rotary load to improve the data set richness metric.

The first embodiment may be provided in a number of forms comprising further features. Certain forms comprise an electronically controllable clutch structured to receive torque from the accessory drive; wherein the rotary load is coupled with the electronically controllable clutch and the electronic control system is configured to engage and disengage the rotary load by actuating the electronically controllable clutch. In certain forms the data set richness metric comprises one or more values accounting for diversity of the one or more associated system operating conditions and an improvement of the data set richness metric comprises an increase in at least one of said one or more values. In certain forms the electronic control system is structured to diagnose or prognosticate a failure state of the rotary load only if the data set richness metric satisfies a predetermined criterion. In certain forms the one or more associated system conditions comprises at least one of engine speed and engine load and the electronic control system controls the timing of engagement of the rotary load to improve the data set richness metric by increasing diversity of one or both of engine speed values and engine load values of the data set. In certain forms the electronic control system controls an additional parasitic load on the engine in combination with controlling the timing of engagement of the rotary load effective to increase data diversity for one or both of engine speed and engine load. In certain forms the electronic control system controls a transmission shift event in combination with controlling the timing of engagement of the rotary load effective to increase data diversity for one or both of engine speed and engine load. In certain forms the electronic control system coordinates operation of one or more subsystems of the system with the engagement of the rotary load effective to vary the parasitic load on the engine to improve the data set richness metric. In certain forms the electronic control system coordinates a transmission gear selection with the engagement of the rotary load to improve the data set richness metric.

A second embodiment is a method comprising: operating an electronic control system in operative communication with a prime mover system comprising an engine structured to output torque to an accessory drive and a rotary load structured to be selectably driven by the accessory drive, the act of operating the electronic control system comprising selectably engaging and disengaging the rotary load effective to vary the load on the engine, receiving engine load values associated with at least one of engagement and disengagement of the rotary load, storing a data set comprising the received engine load values in association with one or more associated system conditions in a non-transitory memory medium, updating a mathematical model of the system stored in the non-transitory memory medium in response to the received engine load values to converge one or more model parameters, diagnosing or prognosticating a failure of the rotary load in response to a change in the one or more model parameters, outputting a diagnostic indication of the failure in response to the diagnosis or prognostication, and at least one of controlling timing of engagement of the rotary load to improve a data set richness metric in response to current or predicted system operating conditions, and controlling operation of or more subsystems of the system during engagement of the rotary load to improve the data set richness metric.

The first embodiment may be provided in a number of forms comprising further features. In certain forms processing performed by the electronic control system is distributed among at least one controller of the vehicle system and at least one controller remote from the vehicle system. In certain forms the data set richness metric comprises one or more values accounting for diversity of the associated system operating conditions and an improvement of the data set richness metric comprises an increase in said one or more values. In certain forms the act of diagnosing or prognosticating a failure state of the rotary load is enables if the data set richness metric satisfies a predetermined criterion. In certain forms the act of controlling timing of engagement of the rotary load to improve the data set richness metric is effective to increase diversity of one or both of engine speed and engine load. In certain forms the act of controlling timing of engagement of the rotary load is performed in coordination with an act of controlling an additional parasitic load on the engine effective to increase data diversity for one or both of engine speed and engine load. Certain forms further comprise controlling a transmission in coordination with controlling the timing of engagement of the rotary load effective to increase data diversity for one or both of engine speed and engine load. In certain forms the act of controlling operation of or more subsystems of the system during engagement of the rotary load is effective to vary net parasitic load on the engine to improve the data set richness metric. In certain forms a transmission gear selection is coordinated with the engagement of the rotary load to improve the data set richness metric.

A third embodiment is an apparatus for diagnosing or prognosticating a system including an engine structured to output torque to an accessory drive, a rotary load structured to be selectably driven by the accessory drive and an electronic control system, the apparatus comprising: at least one non-transitory memory medium configured with instructions executable by a computer to perform the acts of selectably engaging and disengaging the rotary load effective to vary the load on the engine, receiving engine load values associated with at least one of engagement and disengagement of the rotary load, storing a data set comprising the received engine load values and one or more associated system conditions in the at least one non-transitory memory medium, updating a computer-based model of the system stored in the non-transitory memory medium in response to the received engine load values to converge one or more model parameters, diagnosing or prognosticating a failure of the rotary load in response to convergence response of the one or more model parameters, providing a diagnostic indication of the failure in response to the diagnosis or prognostication, and at least one of controlling timing of engagement of the rotary load to improve a data set richness metric in response to current or predicted system operating conditions, and controlling operation of or more subsystems of the system during engagement of the rotary load to improve the data set richness metric.

In certain forms processing performed by the electronic control system is distributed among at least one controller of the vehicle system and at least one controller remote from the vehicle system. In certain forms the data set richness metric comprises one or more values accounting for diversity of the associated system operating conditions and an improvement of the data set richness metric comprises an increase in said one or more values. In certain forms the act of controlling timing of engagement of the rotary load to improve the data set richness metric is effective to increase diversity of one or both of engine speed and engine load. In certain forms the act of controlling timing of engagement of the rotary load is performed in coordination with an act of controlling an additional parasitic load on the engine effective to increase data diversity for one or both of engine speed and engine load. Certain forms further comprise controlling controls a transmission shift event in coordination with controlling the timing of engagement of the rotary load effective to increase data diversity for one or both of engine speed and engine load. In certain forms the act of controlling operation of or more subsystems of the system during engagement of the rotary load is effective to vary net parasitic load on the engine to improve the data set richness metric. In certain forms a transmission gear selection is coordinated with the engagement of the rotary load to improve the data set richness metric.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
    an engine structured to output torque to an accessory drive;
    a rotary load structured to be selectably driven by the accessory drive; and
    an electronic control system configured to
    selectably engage and disengage the rotary load effective to vary the load on the engine,
    monitor engine load values in coordination with at least one of engagement and disengagement of the rotary load,
    store a data set comprising the monitored engine load values in association with values of one or more associated system conditions in a non-transitory memory medium,
    update a mathematical model of the system stored in the non-transitory memory medium in response to the engine load values to converge one or more model parameters,
    diagnose or prognosticate a failure state of the rotary load in response to a change in the one or more model parameters, and
    output a perceptible diagnostic indication of the failure state in response to the diagnosis or prognostication;
    wherein the electronic control system at least one of (a) controls timing of engagement of the rotary load to improve a data set richness metric in response to current or predicted system operating conditions, and (b) controls operation of one or more subsystems of the system in coordination with engagement of the rotary load to improve the data set richness metric.

2. The system of claim 1 comprising:
    an electronically controllable clutch structured to receive torque from the accessory drive;
    wherein the rotary load is coupled with the electronically controllable clutch and the electronic control system is configured to engage and disengage the rotary load by actuating the electronically controllable clutch.

3. The system of claim 1 wherein the data set richness metric comprises one or more values accounting for diversity of the one or more associated system operating conditions and an improvement of the data set richness metric comprises an increase in at least one of said one or more values.

4. The system of claim 3 wherein the electronic control system is structured to diagnose or prognosticate a failure state of the rotary load only if the data set richness metric satisfies a predetermined criterion.

5. The system of claim 1 wherein the one or more associated system conditions comprises at least one of engine speed and engine load and the electronic control system controls the timing of engagement of the rotary load to improve the data set richness metric by increasing diversity of one or both of engine speed values and engine load values of the data set.

6. The system of claim 5 wherein the electronic control system controls an additional parasitic load on the engine in combination with controlling the timing of engagement of the rotary load effective to increase data diversity for one or both of engine speed and engine load.

7. The system of claim 5 wherein the electronic control system controls a transmission shift event in combination with controlling the timing of engagement of the rotary load effective to increase data diversity for one or both of engine speed and engine load.

8. The system of claim 1 wherein the electronic control system coordinates operation of one or more subsystems of the system with the engagement of the rotary load effective to vary the parasitic load on the engine to improve the data set richness metric.

9. The system of claim 1 wherein the electronic control system coordinates a transmission gear selection with the engagement of the rotary load to improve the data set richness metric.

10. A method comprising:
operating an electronic control system in operative communication with a prime mover system comprising an engine structured to output torque to an accessory drive and a rotary load structured to be selectably driven by the accessory drive, the act of operating the electronic control system comprising
selectably engaging and disengaging the rotary load effective to vary the load on the engine,
receiving engine load values associated with at least one of engagement and disengagement of the rotary load,
storing a data set comprising the received engine load values in association with one or more associated system conditions in a non-transitory memory medium,
updating a mathematical model of the system stored in the non-transitory memory medium in response to the received engine load values to converge one or more model parameters,
diagnosing or prognosticating a failure of the rotary load in response to a change in the one or more model parameters,
outputting a diagnostic indication of the failure in response to the diagnosis or prognostication, and
at least one of controlling timing of engagement of the rotary load to improve a data set richness metric in response to current or predicted system operating conditions, and controlling operation of or more subsystems of the system during engagement of the rotary load to improve the data set richness metric.

11. The method of claim 10 wherein processing performed by the electronic control system is distributed among at least one controller of the vehicle system and at least one controller remote from the vehicle system.

12. The method of claim 10 wherein the data set richness metric comprises one or more values accounting for diversity of the associated system operating conditions and an improvement of the data set richness metric comprises an increase in said one or more values.

13. The method of claim 12 wherein the act of diagnosing or prognosticating a failure state of the rotary load is enables if the data set richness metric satisfies a predetermined criterion.

14. The method of claim 10 wherein the act of controlling timing of engagement of the rotary load to improve the data set richness metric is effective to increase diversity of one or both of engine speed and engine load.

15. The method of claim 14 wherein the act of controlling timing of engagement of the rotary load is performed in coordination with an act of controlling an additional parasitic load on the engine effective to increase data diversity for one or both of engine speed and engine load.

16. The method of claim 14 comprising controlling a transmission in coordination with controlling the timing of engagement of the rotary load effective to increase data diversity for one or both of engine speed and engine load.

17. The method of claim 10 wherein the act of controlling operation of or more subsystems of the system during engagement of the rotary load is effective to vary net parasitic load on the engine to improve the data set richness metric.

18. The method of claim 10 wherein a transmission gear selection is coordinated with the engagement of the rotary load to improve the data set richness metric.

19. An apparatus for diagnosing or prognosticating a system including an engine structured to output torque to an accessory drive, a rotary load structured to be selectably driven by the accessory drive and an electronic control system, the apparatus comprising:
at least one non-transitory memory medium configured with instructions executable by a computer to perform the acts of
selectably engaging and disengaging the rotary load effective to vary the load on the engine,
receiving engine load values associated with at least one of engagement and disengagement of the rotary load,
storing a data set comprising the received engine load values and one or more associated system conditions in the at least one non-transitory memory medium,
updating a computer-based model of the system stored in the non-transitory memory medium in response to the received engine load values to converge one or more model parameters,
diagnosing or prognosticating a failure of the rotary load in response to convergence response of the one or more model parameters,
providing a diagnostic indication of the failure in response to the diagnosis or prognostication, and
at least one of controlling timing of engagement of the rotary load to improve a data set richness metric in response to current or predicted system operating conditions, and controlling operation of or more subsystems of the system during engagement of the rotary load to improve the data set richness metric.

20. The apparatus of claim 19 wherein processing performed by the electronic control system is distributed among at least one controller of the vehicle system and at least one controller remote from the vehicle system.

21. The apparatus of claim 19 wherein the data set richness metric comprises one or more values accounting for diversity of the associated system operating conditions and an improvement of the data set richness metric comprises an increase in said one or more values.

22. The apparatus of claim 19 wherein the act of controlling timing of engagement of the rotary load to improve the data set richness metric is effective to increase diversity of one or both of engine speed and engine load.

23. The apparatus of claim 19 wherein the act of controlling timing of engagement of the rotary load is performed in coordination with an act of controlling an additional parasitic load on the engine effective to increase data diversity for one or both of engine speed and engine load.

24. The apparatus of claim 19 comprising controlling controls a transmission shift event in coordination with controlling the timing of engagement of the rotary load effective to increase data diversity for one or both of engine speed and engine load.

25. The apparatus of claim 19 wherein the act of controlling operation of or more subsystems of the system during engagement of the rotary load is effective to vary net parasitic load on the engine to improve the data set richness metric.

26. The apparatus of claim 19 wherein a transmission gear selection is coordinated with the engagement of the rotary load to improve the data set richness metric.

* * * * *